(12) United States Patent
Frank

(10) Patent No.: US 10,009,856 B2
(45) Date of Patent: Jun. 26, 2018

(54) METHOD AND APPARATUS FOR TRANSMITTING PUCCH WITH A LOWER A-MPR

(71) Applicant: MOTOROLA MOBILITY LLC, Chicago, IL (US)

(72) Inventor: Colin Frank, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 45 days.

(21) Appl. No.: 15/043,496

(22) Filed: Feb. 12, 2016

(65) Prior Publication Data

US 2017/0230960 A1 Aug. 10, 2017

Related U.S. Application Data

(60) Provisional application No. 62/292,764, filed on Feb. 8, 2016.

(51) Int. Cl.
*H04W 52/32* (2009.01)
*H04W 72/04* (2009.01)
(Continued)

(52) U.S. Cl.
CPC ....... *H04W 52/325* (2013.01); *H04W 52/146* (2013.01); *H04W 52/367* (2013.01); *H04W 72/0413* (2013.01)

(58) Field of Classification Search
CPC H04W 52/367; H04W 52/146; H04W 52/325
See application file for complete search history.

(56) References Cited

U.S. PATENT DOCUMENTS 8,725,193 B2 * 5/2014 Immonen ............ H04W 52/367
455/522
8,914,058 B2 * 12/2014 Seo ................... H04W 52/32
455/522

(Continued)

OTHER PUBLICATIONS

Ntogari, PCT International Search Report, International application No. PCT/US2017/016290, European Patent Office, Rijswijk, NL, dated Apr. 26, 2017.

(Continued)

*Primary Examiner* — Hassan Kizou
*Assistant Examiner* — Deepa Belur
(74) *Attorney, Agent, or Firm* — Matthew C. Loppnow; The Watson I.P. Group, PLC

(57) ABSTRACT

A method and apparatus for transmit a Physical Uplink Control Channel (PUCCH) with a lower Additional Maximum Power Reduction (A-MPR). A first A-MPR to apply to a transmission power can be ascertained at a device for a first resource block of a PUCCH transmission. A second A-MPR to apply to a transmission power can be ascertained for a second resource block of a PUCCH transmission. A difference between the first A-MPR and the second A-MPR can be determined. A PUCCH resource block can be transmitted in a slot of a subframe only for the PUCCH resource block of the first and second resource blocks with a lower A-MPR of the first A-MPR and the second A-MPR when a magnitude of the difference between the first A-MPR and the second A-MPR is greater than an A-MPR difference threshold.

22 Claims, 7 Drawing Sheets

(51) Int. Cl.
*H04W 52/14* (2009.01)
*H04W 52/36* (2009.01)

(56) References Cited

U.S. PATENT DOCUMENTS

| | | | | |
|---|---|---|---|---|
| 9,179,423 | B2 | 11/2015 | Vujcic | |
| 9,386,543 | B2 | 7/2016 | Fabien | |
| 9,520,984 | B2 | 12/2016 | Yang | |
| 2011/0274092 | A1* | 11/2011 | Liu | H04W 72/10 370/335 |
| 2013/0039289 | A1* | 2/2013 | Lee | H04W 52/367 370/329 |
| 2013/0065585 | A1* | 3/2013 | Pelletier | H04W 4/02 455/435.1 |
| 2013/0136073 | A1* | 5/2013 | Kato | H04L 5/0007 370/329 |
| 2014/0378180 | A1* | 12/2014 | Schwent | H04W 52/241 455/522 |
| 2015/0208346 | A1 | 7/2015 | Piipponen | |
| 2015/0304962 | A1* | 10/2015 | Fabien | H04W 52/247 370/329 |
| 2016/0330740 | A1* | 11/2016 | Uchino | H04W 74/006 |
| 2017/0195978 | A1* | 7/2017 | Lindholm | H04W 52/346 |
| 2017/0223641 | A1* | 8/2017 | Haim | H04W 52/248 455/69 |

OTHER PUBLICATIONS

Motorola Mobility: "PUCCH Considerations for Intra-Band Carrier Aggregation", 3GPP Draft; R4-161018, 3rd Generation Partnership Project (3GPP), Mobile Competence Centre; 650, Route Des Lucioles; F-06921 Sophia-Antipolis Cedex; France, vol. RAN WG4, No. Malta; 20160215-20160219, Feb. 8, 2016 (Feb. 8, 2016).
Belur, Notice of References, PTO-892, U.S. Appl. No. 15/273,257, U.S. Patent and Trademark Office, dated Oct. 6, 2017.
Belur, Notice of References, PTO-892, U.S. Appl. No. 15/273,257, U.S. Patent and Trademark Office, dated Mar. 5, 2017.

* cited by examiner

METHOD AND APPARATUS FOR TRANSMITTING PUCCH WITH A LOWER A-MPR

BACKGROUND

1. Field

The present disclosure is directed to a method and apparatus for transmitting a Physical Uplink Control Channel (PUCCH) with a lower Additional Maximum Power Reduction (A-MPR).

2. Introduction

Presently, wireless communication devices, otherwise known as User Equipment (UE), such as smartphones, laptop computers, wireless terminals, and other wireless communication devices, communicate with other communication devices using wireless signals. To communicate over a wireless network, the wireless communication devices use control channels to signal channel information. For example, a Physical Uplink Control Channel (PUCCH) is used to carry uplink control information from a wireless communication device to a wireless communication station, such as a base station, an enhanced NodeB (eNB), an access point, or other wireless communication station that connects the wireless communication device with at least one network, the Internet, and other communication devices.

There is a problem with PUCCH operation for a network supporting intra-band contiguous Carrier Aggregation (CA) where more than one carrier is aggregated together in a contiguous frequency spectrum to increase data throughput. When transmitting on an uplink to a base station, a UE uses an Additional Maximum Power Reduction (A-MPR) to reduce the allowed minimum value of its maximum output power. Different regions in the transmission spectrum provide for different A-MPR. The issue is that that a 0 dB A-MPR region, such as a low A-MPR region, is different depending on whether the UE is configured for single Component Carrier (CC) operation or if the UE is configured for CA. As a consequence, a network operator may not be able to over-provision the PUCCH region, such as reassign the Resource Blocks (RB's) allocated for the PUCCH region, enough to allow 0 dB of A-MPR for a UE configured for CA. Furthermore, the A-MPR for Resource Blocks (RB's) in the PUCCH may be very asymmetric, with the RB nearest to the edge of the aggregated spectrum requiring very large A-MPR while the RB near the center of the aggregated spectrum may require no A-MPR at all. With the current specification, both RB's are allowed to use the maximum of the two A-MPR values.

As mentioned above, the existing solution for single CC is to over-provision the PUCCH, such as adjust the PUCCH region, so that the PUCCH RB pair is in a frequency region with 0 or small A-MPR. For a UE configured for CA, it will not in general be possible to over-provision the PUCCH sufficiently to have 0 dB A-MPR since the location of the UE local oscillator is in the middle of the aggregated spectrum. Furthermore, the operator may not wish to configure the PUCCH region for the needs of the CA UE over the needs of the non-CA UE's.

Thus, there is a need for a method and apparatus for transmitting a PUCCH with a lower A-MPR.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for transmitting a Physical Uplink Control Channel (PUCCH) with a lower Additional Maximum Power Reduction (A-MPR). According to a possible embodiment, a first A-MPR to apply to a transmission power can be ascertained at a device for a first resource block of a PUCCH transmission. A second A-MPR to apply to a transmission power can be ascertained for a second resource block of a PUCCH transmission. A difference between the first A-MPR and the second A-MPR can be determined. A PUCCH resource block can be transmitted in a slot of a subframe only for the PUCCH resource block of the first and second resource blocks with a lower A-MPR of the first A-MPR and the second A-MPR when a magnitude of the difference between the first A-MPR and the second A-MPR is greater than an A-MPR difference threshold.

Figure 1:
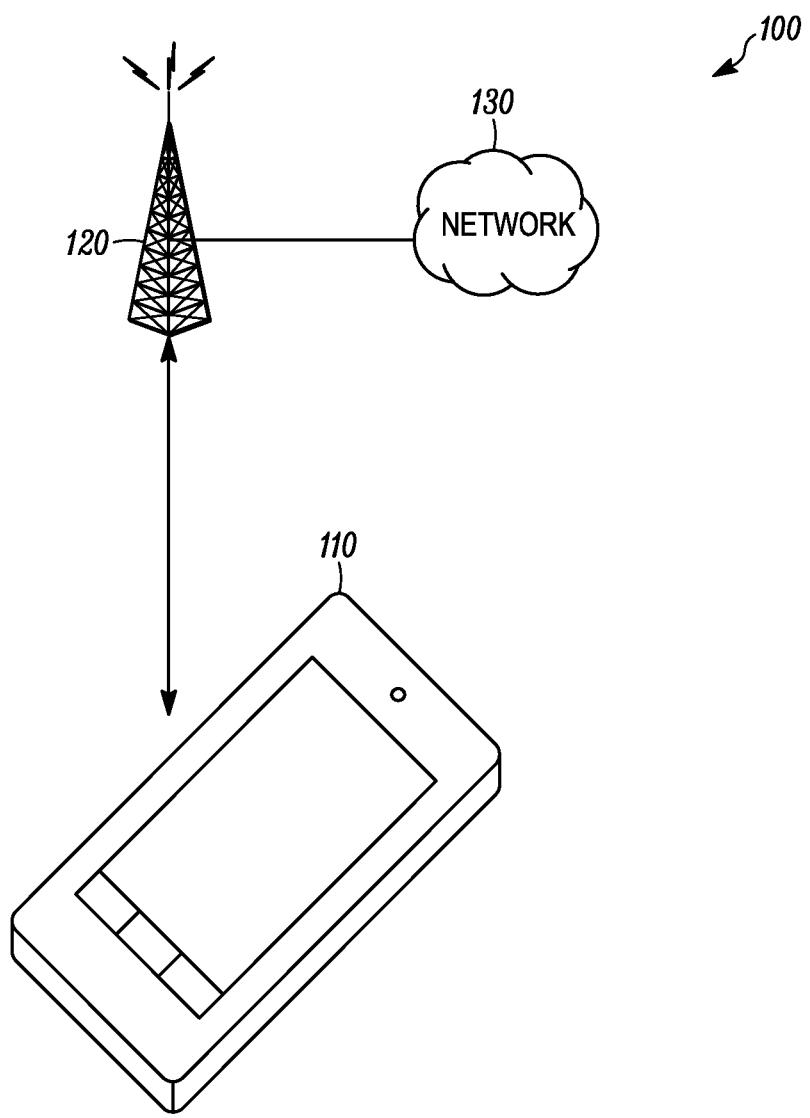
FIG. 1 is an example block diagram of a system according to a possible embodiment.

FIG. 1 is an example block diagram of a system 100 according to a possible embodiment. The system 100 can include a User Equipment (UE) 110, a base station 120, such as an enhanced NodeB (eNB), an access point, or other communication station, and a network 130. The UE 110 can be a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, and/or other WWAN communications networks.

In operation, the UE 110 uses a Physical Uplink Control Channel (PUCCH) to carry uplink control information from the UE to the base station 110. Embodiments can improve PUCCH performance for intra-band contiguous Carrier Aggregation (CA) and even for a single band Component Carrier (CC). For example, there is a problem with PUCCH operation for a network supporting intra-band contiguous CA. The issue is that that the low A-MPR region, such as the 0 dB A-MPR region, is different depending on whether the UE is configured for single CC operation or if the UE is configured for CA. One reason for the difference is that the location of the UE local oscillator is different depending on whether the UE is configured for single CC operation or for intra-band contiguous CA operation. Another reason for the difference is that the emissions requirements for the UE are defined relative to the single CC spectrum for single CC operation, and are defined relative to the spectrum of the aggregated CC's for CA operation. Additionally, even when the UE is configured for CA operation, the PUCCH is sent on the primary cell (PCell). For at least these reasons, the A-MPR needed to meet emissions requirements when transmitting the PUCCH depends on whether the UE is configured for CA operation or is configured for single CC operation.

Consider the example of Band 42 for which a network signaling value NS_22 that signals additional spurious emissions requirements for a specific deployment scenario as shown in the 3GPP LTE specification Table 6.6.3.3.16-1 below is signaled for a single CC UE, and a carrier aggregation network signaling value CA_NS_08 that signals additional spurious emissions requirements for a specific deployment scenario as shown in Table 2 below is signaled for a CA UE. Note that the same emission requirements apply for both NS_22 and CA_NS_08.

TABLE 6.6.3.3.16-1

Additional requirement NS_22

| Frequency band (MHz) | Channel bandwidth/Spectrum emission limit (dBm) 5, 10, 15, 20 MHz | MBW |
|---|---|---|
| 3400 ≤ f ≤ 3800 | −23 (NOTE 1, NOTE 3) | 5 MHz |
|  | −40 (NOTE 2) | 1 MHz |

NOTE 1:
This requirement applies within an offset between 5 MHz and 25 MHz from the lower and from the upper edge of the channel bandwidth, whenever these frequencies overlap with the specified frequency band.
NOTE 2:
This requirement applies from 3400 MHz to 25 MHz below the lower E-UTRA channel edge and from 25 MHz above the upper E-UTRA channel edge to 3800 MHz.
NOTE 3:
This emission limit might imply risk of harmful interference to UE(s) operating in the protected operating band.

TABLE 2

CA_NS_8 Additional requirement.

| Frequency band (MHz) | Channel bandwidth/Spectrum emission limit (dBm) | MBW |
|---|---|---|
| 3400 ≤ f ≤ 3800 | −23 (NOTE 1, NOTE 3) | 5 MHz |
|  | −40 (NOTE 2) | 1 MHz |

NOTE 1:
This requirement applies within an offset between 5 MHz and 25 MHz from the lower and from the upper edge of the channel bandwidth.
NOTE 2:
This requirement applies from 3400 MHz to 25 MHz below the lower E-UTRA channel edge and from 25 MHz above the upper E-UTRA channel edge to 3800 MHz.
NOTE 3:
This emission limit might imply risk of harmful interference to UE(s) operating in the protected operating band.

For a UE in single CC operation, the operator must over-provision the PUCCH by 21 RB's for no A-MPR for a 20 MHz carrier. For example, an operator can over-provision the PUCCH by shifting the PUCCH RB's inwards symmetrically from each edge of the component carrier so that the PUCCH RB's are an equal number of RB's away from each edge of a component carrier in the frequency domain. Alternatively, if the operator can accept 3 dB of A-MPR for the PUCCH and still meet coverage requirements, then no over-provisioning of the PUCCH is required for the non-CA UE.

TABLE 6.2.4-17

A-MPR for "NS-22"

| Channel bandwidth [MHz] | Parameters | Region A | Region B | Region C | Region D |
|---|---|---|---|---|---|
| 20 | $RB_{start}$ | 0-35 | 0-51 | ≤21 | ≥31 |
|  | $L_{CRB}$ [RBs] | >64 | 49-64 | ≤48 | ≤48 |
|  | $RB_{start}$ + LCRB [RBs] | N/A | N/A | N/A | ≥79 |
|  | A-MPR [dB] | ≤5 | ≤4 | ≤3 | ≤3 |

NOTE 1;
RBstart indicates the lowest RB index of transmitted resource blocks.
NOTE 2;
LCRB is the length of a contiguous resource block allocation.
NOTE 3;
For intra-subframe frequency hopping between two regions, notes 1 and 2 apply per slot basis.
NOTE 4;
For intra-subframe frequency hopping between two regions, the larger A-MPR value of the two regions may be applied for both slots in the subframe.

In the 3GPP LTE specification Table 6.2.4-17 above, $L_{CRB}$ can be a transmission bandwidth which represents the length of a contiguous resource block allocation expressed in units of resources blocks. Also, $RB_{start}$ can indicate the lowest RB index of transmitted resource blocks.

Conversely, for a UE configured for CA of two 20 MHz carriers, the operator must over-provision the PUCCH by 58 RB's for no A-MPR if CA_NS_08 is signaled, and this is not possible since a 20 MHz CC only has 100 RB's. Additionally, unless the operator over-provisions the PUCCH by at least 21 RB's, 11 dB of A-MPR will be needed to meet the CA_NS_08 emissions requirements.

Figure 2:
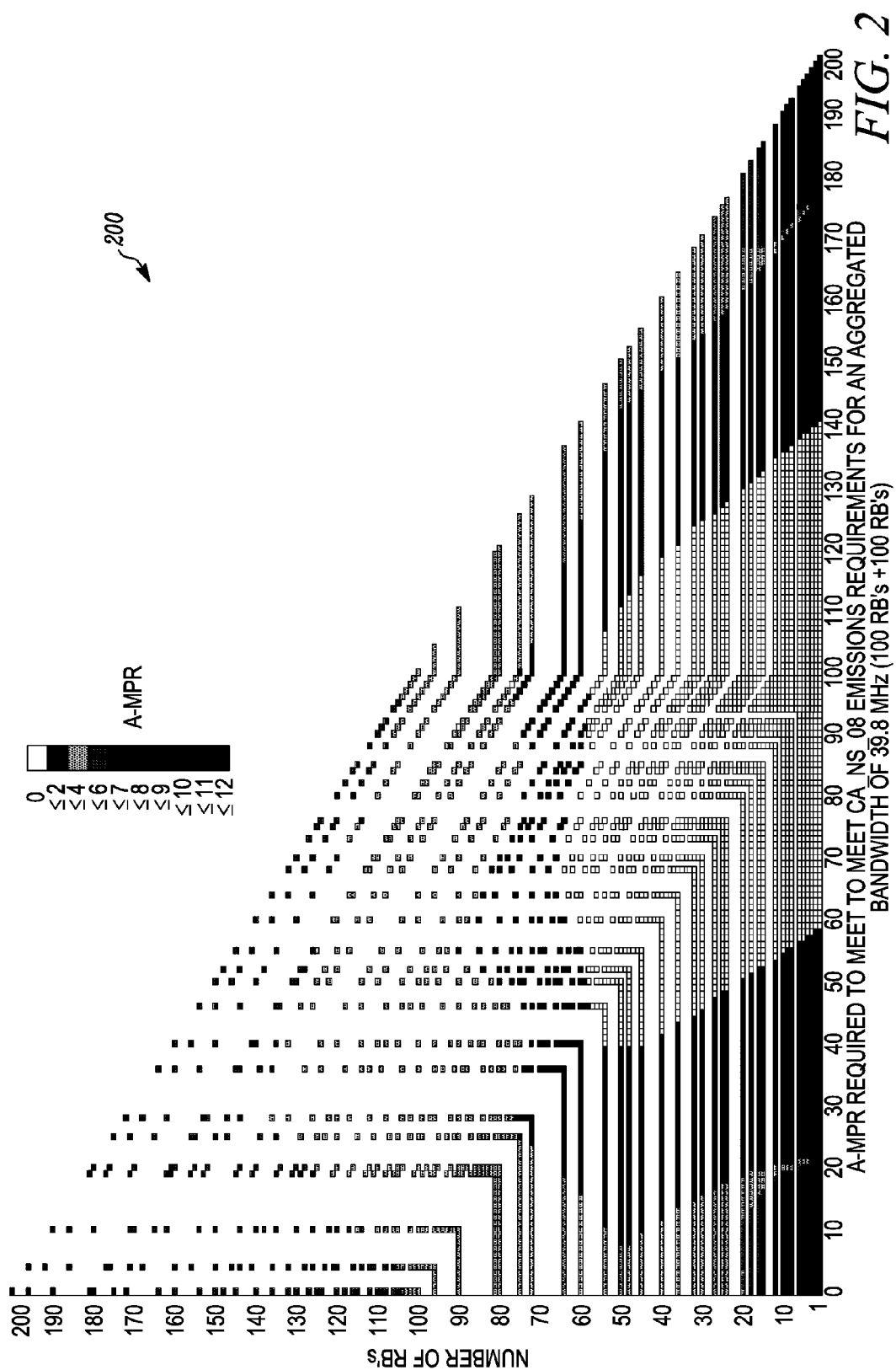
FIG. 2 is an example illustration of a graph according to a possible embodiment.

FIG. 2 is an example illustration of a graph 200 according to a possible embodiment. The graph 200 shows the A-MPR needed for the aggregation of two 20 MHz carriers. For example, the graph 200 shows the A-MPR required to meet CA_NS_08 emissions requirements for an aggregated bandwidth of 39.8 MHz (100 RB's+100 RB's). The graph 200 also shows that the UE does not need any A-MPR to meet CA_NS_08 emissions for a single RB in locations 59 to 140 (numbering is 0 to 199). Thus, if the PCell for the UE is the lower carrier and the UE PUCCH RB pair is 0 and 99, the UE is allowed 11 dB of A-MPR for RB 0 and no A-MPR for RB 99. Similarly, if the PCell for the UE is the upper carrier and the UE PUCCH RB pair is 100 and 199, the UE is allowed 11 dB of A-MPR for RB 199 and no A-MPR for RB 100.

A new higher power class of 26 dBm may be introduced for Band 41. If the emissions behavior is the same for this new power class power amplifier, then the A-MPR for the edge RB's (RB's 0 and 199) is likely to be at least 14 dB, while the A-MPR for the RB's nearest to the center of the aggregated spectrum (RB's 99 and 100) is likely to remain 0 dB. Thus, for the new power class, the A-MPR allowed for both PUCCH RB's (the pair 0 & 99 or the pair 100 & 199) would be 14 dB, even though no A-MPR is required for the RB of the pair that is nearest to the center of the aggregated spectrum.

According to the definition of a configured maximum device output power for a serving cell ($P_{CMAX\_L}$) for carrier aggregation, for each subframe, the $P_{CMAX\_L}$ is evaluated per slot and given by the minimum value taken over the transmission(s) within the slot; the minimum $P_{CMAX\_L}$ over the two slots is then applied for the entire subframe. $P_{PowerClass}$ shall not be exceeded by the UE during any period of time. Thus, even though no A-MPR is needed for RB 99 for the PUCCH pairing of RB's 0 and 99, 11 dB of A-MPR will be allowed for both RB's. Similarly, for the PUCCH pairing of RB's 100 and 199, 11 dB of A-MPR will be allowed for both RB's even though no A-MPR is needed for RB 100.

The above description illustrates two problems. The first problem is that the operator may have difficulty configuring the PUCCH region for contiguous carrier aggregation because the no A-MPR region will be much different for UE's configured for carrier aggregation than for UE's configured for single CC operation. As a part of this first problem, it may not be possible for the operator to configure the PUCCH region for no A-MPR for a UE configured for carrier aggregation. The second problem is that, for the UE configured for carrier aggregation, it will often be the case that large A-MPR is required for one RB of the PUCCH RB pair (the RB at the edge of the aggregated spectrum), while no A-MPR is required for the other RB of the PUCCH RB pair (the RB near the center of the aggregated spectrum). Because the allowed A-MPR for the subframe is the maximum of the A-MPR allowed for the two slots, very large A-MPR will be allowed (and taken) for PUCCH RB's for which no A-MPR is required.

According to a possible embodiment, a UE can only transmit in the slot for the PUCCH RB for which the lower A-MPR is allowed. This can be done in the case that the allowed A-MPR difference between the two PUCCH RB's exceeds a threshold of Z dB. The value of Z can be set in the specification 36.101 and pre-set in memory of a UE, can be set in the specification 36.101 and signaled to the UE, such as by signaling the value of this parameter using the System Information Block (SIB) or using Radio Link Control (RLC) signaling, can be determined by a network operator and signaled to the UE, such as by using the System Information Block (SIB) or using Radio Link Control (RLC) signaling, and/or can be otherwise provided to the UE. If the A-MPR difference exceeds 3 dB, the total PUCCH energy can be greater if the UE transmits only on the RB in the slot with lower A-MPR than if it uses the maximum of the two A-MPR values and transmits a PUCCH RB in both slots. For example, the UE can be required to transmit only on the PUCCH RB with lower allowed A-MPR in the case that the A-MPR difference for the two PUCCH RB's exceeds 4 dB (Z=4). This embodiment can be used only for UE's configured for contiguous carrier aggregation, or it can be used more generally for non-CA UE's in the case of asymmetric emissions requirements.

The A-MPR difference threshold can depend on the difference in the signal-to-noise ratio needed to successfully demodulate the PUCCH transmission when it is transmitted on both PUCCH RB's and the signal-to-noise ratio needed to successfully demodulate the PUCCH transmission when it is transmitted on only one of the PUCCH RB's. If the signal transmitted on the two PUCCH RB's is the same (e.g., if the PUCCH transmission on the second PUCCH RB is a repetition of the PUCCH transmission on the first PUCCH RB), then the difference in the signal-to-noise ratio requirement may be 3 dB. However, the difference in signal-to-noise ratio for successful reception may be larger than 3 dB if different systematic and parity symbols are sent on the two PUCCH RB's. In general, the A-MPR difference threshold can depend on the encoding method used for the PUCCH transmission. In some cases, the PUCCH may not be uniquely decodable from each of the two RB's separately. If the PUCCH transmission is not uniquely decodable from each transmission separately, then it may be necessary to modify the encoding of the PUCCH when the PUCCH is transmitted on only one of the two PUCCH RB's so that the message is uniquely decodable from each PUCCH RB separately, and so that the signal-to-noise ratio required to demodulate the single RB transmission is minimized.

Figure 3:
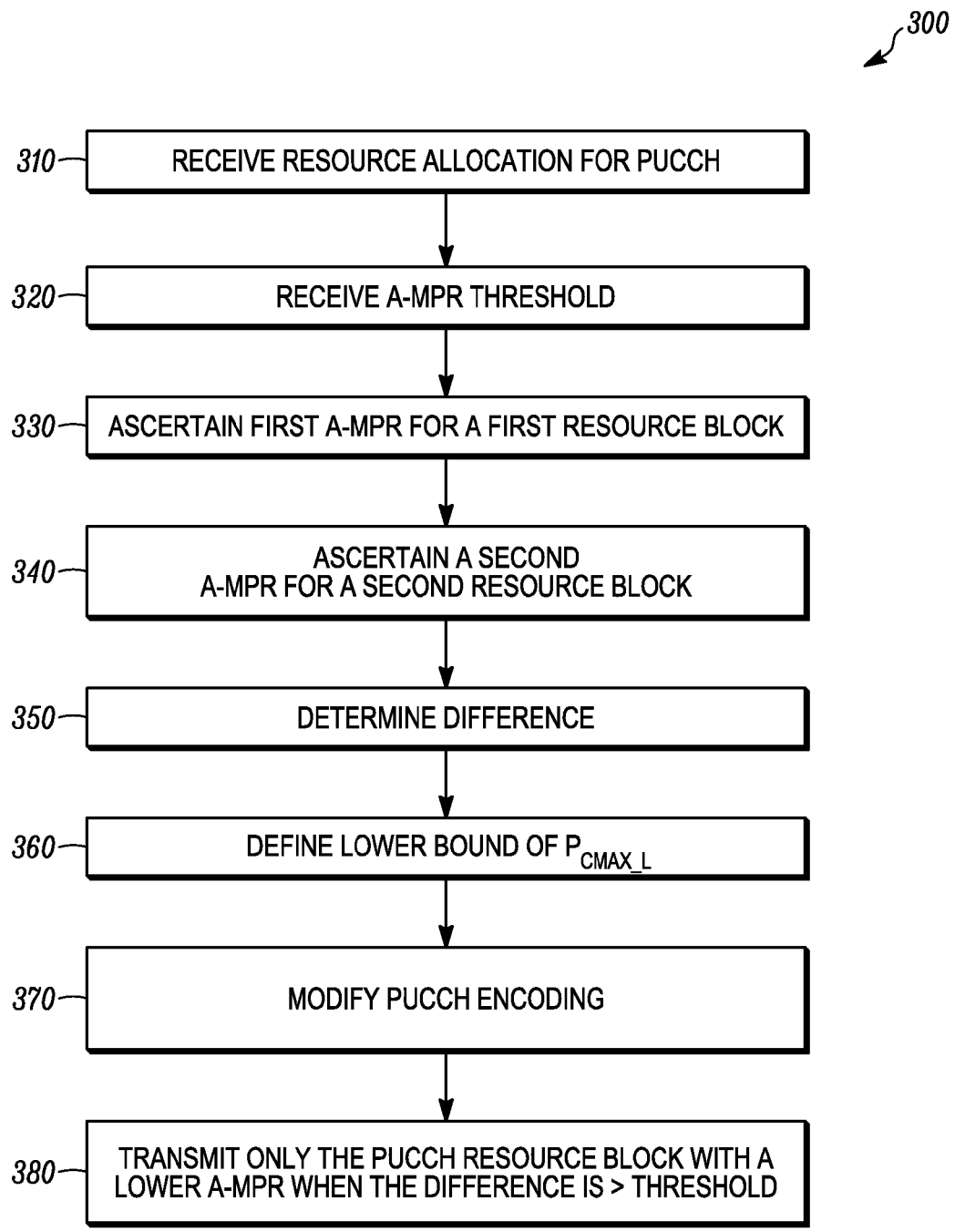
FIG. 3 is an example flowchart illustrating the operation of a user equipment according to a possible embodiment.

FIG. 3 is an example flowchart 300 illustrating the operation of a UE, such as the UE 110, according to a possible embodiment. At 310, an indication of a resource allocation assignment of resource blocks for the PUCCH transmission can be received. According to a possible implementation, information for the PUCCH assignment can be signaled to the device, such as by using Radio Link Control (RLC) signaling, using a System Information Block (SIB), or by using any other method for signaling a PUCCH. Signaling the A-MPR difference threshold may be used over the SIB rather than using RLC signaling to reduce signaling overhead since the SIB is a broadcast message that can be received by all UE's in the cell, and this is in contrast to RLC signaling which is sent to each UE separately. At 320, an A-MPR difference threshold can be received at the UE. Alternately, the A-MPR difference threshold can be pre-loaded in a memory of the UE, such as before the UE is sold to a consumer.

At 330, a first Additional Maximum Power Reduction (A-MPR) to apply to a transmission power for a first resource block of a PUCCH transmission can be ascertained at the UE. At 340, a second A-MPR to apply to a transmission power for a second resource block of a PUCCH transmission can be ascertained. The first and second A-MPR can be dependent on whether the device is configured for carrier aggregation or configured for a single component carrier. A carrier can be a bandwidth configuration used for transmission in LTE. At 350, a difference between the first A-MPR and the second A-MPR can be determined. At 360, a lower bound of a configured maximum device output power for a serving cell ($P_{CMAX\_L}$) can be defined for the subframe using the slot with the lower A-MPR.

At 370, PUCCH encoding can be modified when transmitting PUCCH in a slot of a subframe only for the PUCCH resource block of the first and second resource blocks with a lower A-MPR of the first A-MPR and the second A-MPR when a magnitude of the difference between the first A-MPR and the second A-MPR is greater than an A-MPR difference threshold. For example, the PUCCH encoding can be modified to minimize the Signal-to-Interference plus Noise Ratio (SINR) needed to decode the one PUCCH resource block and also make sure that the transmission is uniquely decodable from the single resource block transmission. This modification may or may not be used and can depend on the type of PUCCH transmission.

For example, according to a possible embodiment, the PUCCH transmission can be power controlled to a target power $P_{PUCCH\_TARGET}$. In this embodiment, the decision to transmit on one or both PUCCH RB's can be made in the following manner:

i) The UE can first compute $P_{CMAX\_L}$ for each slot separately to get values $P_{CMAX\_L1}$ and $P_{CMAX\_L2}$, respectively for the first and second slots, where $P_{CMAX\_L1}$ can depend on the PUCCH RB for the first slot and $P_{CMAX\_L2}$ can depend on the PUCCH RB for the second slot.

ii) The UE can then compute two values Delta_slot1 and Delta_slot2 by subtracting $P_{PUCCH\_TARGET}$ from $P_{CMAX\_L1}$ and $P_{CMAX\_L2}$, respectively, so that $$\text{Delta\_slot1} = P_{CMAX\_L1} - P_{PUCCH\_TARGET}$$
$$\text{Delta\_slot2} = P_{CMAX\_L2} - P_{PUCCH\_TARGET}$$

iii) If Delta_slot1 and Delta_slot2 are both greater than or equal to 0, then the UE can transmit on the PUCCH RB in each slot.

iv) If at least one of Delta_slot1 and Delta_slot1 is less than 0, and if the difference max(Delta_slot1, Delta_slot2)−min(Delta_slot1, Delta_slot2) is less than the A-MPR difference threshold, then the UE can transmit on the PUCCH RB in each slot.

v) If at least one of Delta_slot1 and Delta_slot1 is less than 0, and if the difference max(Delta_slot1, Delta_slot2)−min(Delta_slot1, Delta_slot2) exceeds the A-MPR difference threshold, then the UE can transmit only in the slot i with the lower A-MPR. The transmit power in this slot can be set equal to the min($P_{CMAX\_Li}$, $P_{PUCCH\_TARGET}$+A-MPR difference threshold), where $P_{CMAX\_Li}$ can be $P_{CMAX\_L}$ for the slot with the lower A-MPR. The coding of the PUCCH may be modified when it is transmitted on only one of the two PUCCH RB's in order to minimize the signal-to-noise ratio needed to decode the PUCCH transmission and to ensure the PUCCH transmission is uniquely decodable.

In another embodiment, when a UE configured for contiguous intra-band carrier aggregation is transmitting only on the PUCCH in a subframe, the UE is required to reconfigure for single component carrier transmission prior to transmitting the PUCCH only transmission, where the UE is reconfigured by moving the transmitter local oscillator to the center of the component carrier on which the PUCCH is being transmitted. In this embodiment, the single component carrier A-MPR for the component carrier on which the PUCCH is transmitted applies when the UE is transmitting only on the PUCCH. When not transmitting only on the PUCCH, the UE can be reconfigured for intra-band carrier aggregation and the contiguous intra-band carrier aggregation A-MPR applies.

At 380, a PUCCH resource block can be transmitted in a slot of a subframe only for the PUCCH resource block of the first and second resource blocks with a lower A-MPR of the first A-MPR and the second A-MPR when a magnitude of the difference between the first A-MPR and the second A-MPR is greater than an A-MPR difference threshold. Transmitting can include transmitting the PUCCH resource block in the slot of a subframe only for the PUCCH resource block of the first and second resource blocks using the lower A-MPR applied to a transceiver uplink transmission power when the difference between the first A-MPR and the second A-MPR is greater than a threshold. The A-MPR difference threshold can be dependent on whether the device is configured for carrier aggregation or configured for a single component carrier. If there is no difference between the first A-MPR and the second A-MPR, or if the difference is less than the A-MPR difference threshold, the PUCCH can be transmitted on both the first and second resource blocks.

Figure 4:
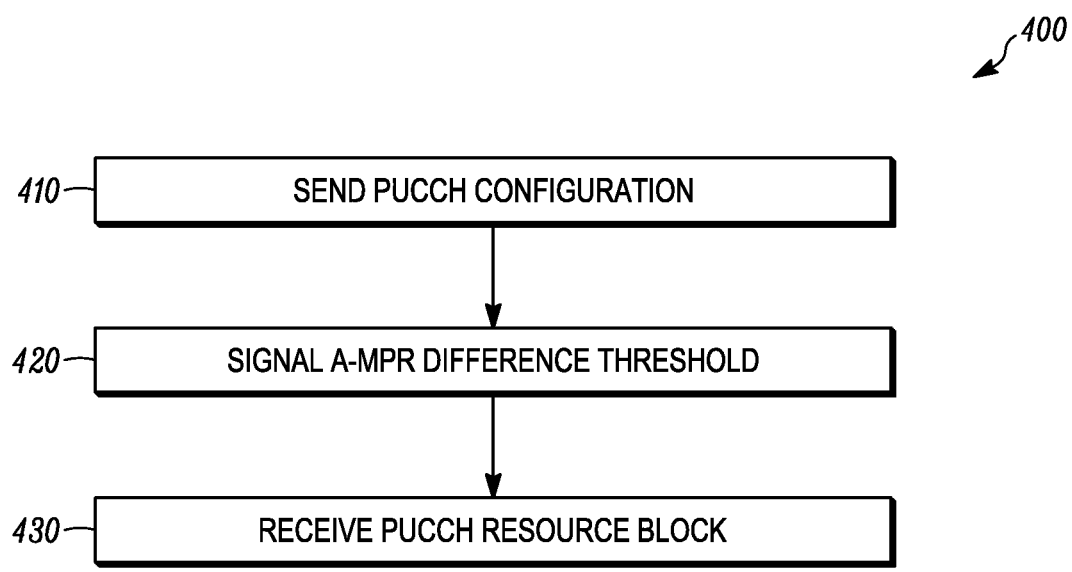
FIG. 4 is an example flowchart illustrating the operation of a base station according to a possible embodiment.

FIG. 4 is an example flowchart 400 illustrating the operation of a base station, such as the base station 120, according to a possible embodiment. At 410, a PUCCH configuration can be sent, such as to the UE 110. Sending the PUCCH configuration can include sending an indication of a resource allocation of resource blocks for transmission of the PUCCH. At 420, an A-MPR difference threshold for the UE 110 can be signaled. The A-MPR difference threshold can be for the UE 110 to transmit in a PUCCH resource block in a slot of a subframe for the PUCCH configuration based on the A-MPR difference threshold. The A-MPR difference threshold can be signaled over SIB, RLC, or any other means for signaling an A-MPR difference threshold. The A-MPR difference threshold can indicate a threshold for the UE 110 to transmit in a slot of a subframe only for a PUCCH resource block with a lower A-MPR when a magnitude of a difference between a first A-MPR for a first PUCCH resource block and a second A-MPR for a second PUCCH resource block is greater than an A-MPR difference threshold. The A-MPR difference threshold can be dependent on whether the device is configured for carrier aggregation or configured for a single component carrier. At 430, the PUCCH resource block can be received in the slot of the subframe.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 5:
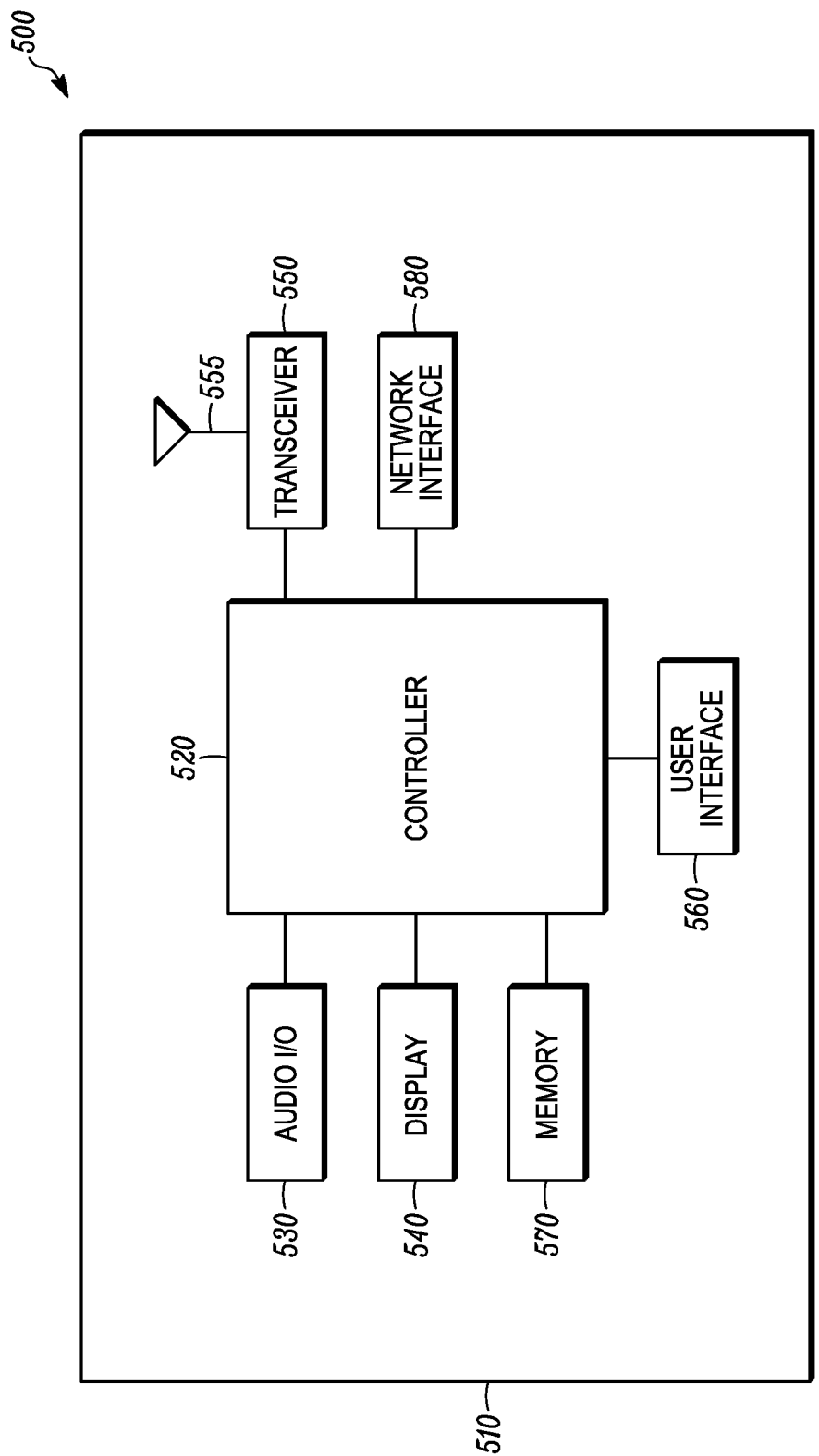
FIG. 5 is an example block diagram of an apparatus according to a possible embodiment.

FIG. 5 is an example block diagram of an apparatus 500, such as the UE 110, according to a possible embodiment. The apparatus 500 can include a housing 510, a controller 520 within the housing 510, audio input and output circuitry 530 coupled to the controller 520, a display 540 coupled to the controller 520, a transceiver 550 coupled to the controller 520, an antenna 555 coupled to the transceiver 550, a user interface 560 coupled to the controller 520, a memory 570 coupled to the controller 520, and a network interface 580 coupled to the controller 520. The apparatus 500 can perform the methods described in all the embodiments.

The display 540 can be a viewfinder, a liquid crystal display (LCD), a light emitting diode (LED) display, a plasma display, a projection display, a touch screen, or any other device that displays information. The transceiver 550 can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The network interface 580 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 570 can include a random access memory, a read only memory, an optical memory, a flash memory, a removable memory, a hard drive, a cache, or any other memory that can be coupled to a wireless communication device.

The apparatus 500 or the controller 520 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 570 or elsewhere on the apparatus 500. The apparatus 500 or the controller 520 may also use hardware to implement disclosed operations. For example, the controller 520 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 520 may be any controller or processor device or devices capable of operating a wireless communication device and implementing the disclosed embodiments.

In operation, the transceiver 550 can receive an indication of a resource allocation assignment of resource blocks for the PUCCH transmission. The controller 520 can ascertain a first Additional Maximum Power Reduction (A-MPR) to apply to a transmission power for a first resource block of a PUCCH transmission. The controller 520 can ascertain a second A-MPR to apply to a transmission power for a second resource block of a PUCCH transmission The controller 520 can determine a difference between the first A-MPR and the second A-MPR. The first and second A-MPR are dependent on whether the apparatus 500 is configured for carrier aggregation or configured for a single component carrier. The transceiver 550 can transmit a PUCCH resource block in a slot of a subframe only for the PUCCH resource block of the first and second resource blocks with a lower A-MPR of the first A-MPR and the second A-MPR when a magnitude of the difference between the first A-MPR and the second A-MPR is greater than an A-MPR difference threshold. The controller 520 to cause the transceiver to transmit the PUCCH resource block. The A-MPR difference threshold can be dependent on whether the apparatus is configured for carrier aggregation or configured for a single component carrier. According to a possible implementation, the transceiver can receive the A-MPR difference threshold. According to another possible implementation, the A-MPR difference threshold can be pre-loaded in the memory 570. According to a further possible implementation, the controller 520 can define a lower bound of a configured maximum transceiver output power for a serving cell ($P_{CMAX\_L}$) for the subframe using the slot with the lower A-MPR.

Figure 6:
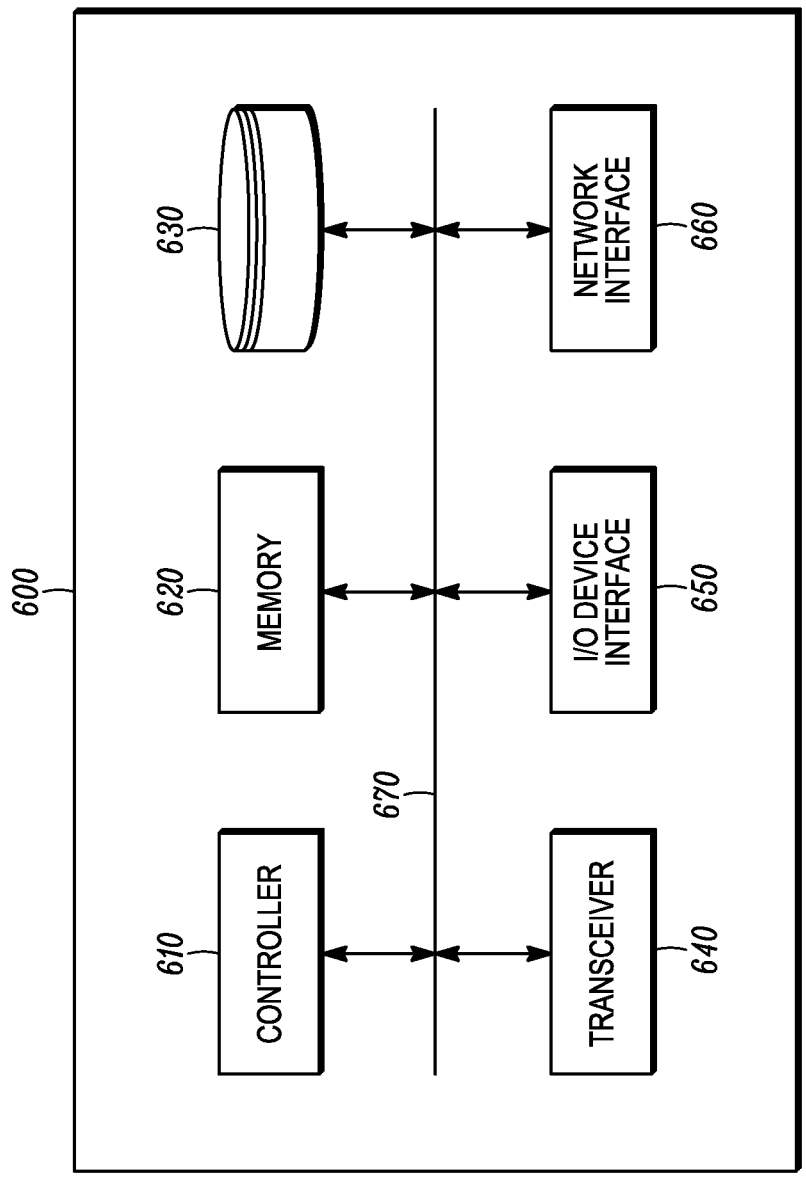
FIG. 6 is an example block diagram of a base station according to a possible embodiment.

FIG. 6 is an example block diagram of a base station 600, such as the base station 120, according to a possible embodiment. The base station 600 may include a controller 610, a memory 620, a database interface 630, a transceiver 640, Input/Output (I/O) device interface 650, a network interface 660, and a bus 670. The base station 600 may implement any operating system, such as Microsoft Windows®, UNIX, or LINUX, for example. Base station operation software may be written in any programming language, such as C, C++, Java or Visual Basic, for example. The base station software may run on an application framework, such as, for example, a Java® server, a .NET® framework, or any other application framework.

The transceiver 640 may create a data connection with the UE 110. The controller 610 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 610 may be any controller or processor device or devices capable of operating a base station and implementing the disclosed embodiments.

The memory 620 may include volatile and nonvolatile data storage, including one or more electrical, magnetic, or optical memories, such as a Random Access Memory (RAM), cache, hard drive, or other memory device. The memory 620 may have a cache to speed access to specific data. The memory 620 may also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data may be stored in the memory 620 or in a separate database. For example, the database interface 630 may be used by the controller 610 to access the database. The database may contain any formatting data to connect the UE 110 to the network 130.

The I/O device interface 650 may be connected to one or more input and output devices that may include a keyboard, a mouse, a touch screen, a monitor, a microphone, a voice-recognition device, a speaker, a printer, a disk drive, or any other device or combination of devices that accept input and/or provide output. The I/O device interface 650 may receive a data task or connection criteria from a network administrator. The network connection interface 660 may be connected to a communication device, modem, network interface card, a transceiver, or any other device capable of transmitting and receiving signals to and from the network 130. The components of the base station 600 may be connected via the bus 670, may be linked wirelessly, or may be otherwise connected.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

In operation, the base station 600 can perform operation described in the embodiments. For example, the controller 610 can cause the transceiver 640 to send a PUCCH configuration and signal an A-MPR difference threshold for a device to transmit in a PUCCH resource block in a slot of a subframe for the PUCCH configuration based on the A-MPR difference threshold. The transceiver 640 can receive the PUCCH resource block in the slot of the subframe.

According to another possible embodiment, for a UE configured for carrier aggregation, A-MPR can be defined independently for the first and second slots. Thus, the UE configured for carrier aggregation can be allowed different A-MPR for the first and second slots of the PUCCH transmission. In the case of CA_NS_08, this can often mean the CA UE can be allowed more A-MPR than the single CC UE for the PUCCH RB nearest to the edge of the aggregated spectrum, but the CA UE can be allowed less A-MPR than the single CC UE for the PUCCH RB nearest to the center of the aggregated spectrum. This embodiment may have the UE to change power between slots. Because the UE can change RB's between first and second subframes, there can be an allowed transition period between the first and second slots. Just as the RB changes during this transition period, the power level can also be changed during this transition period.

Figure 7:
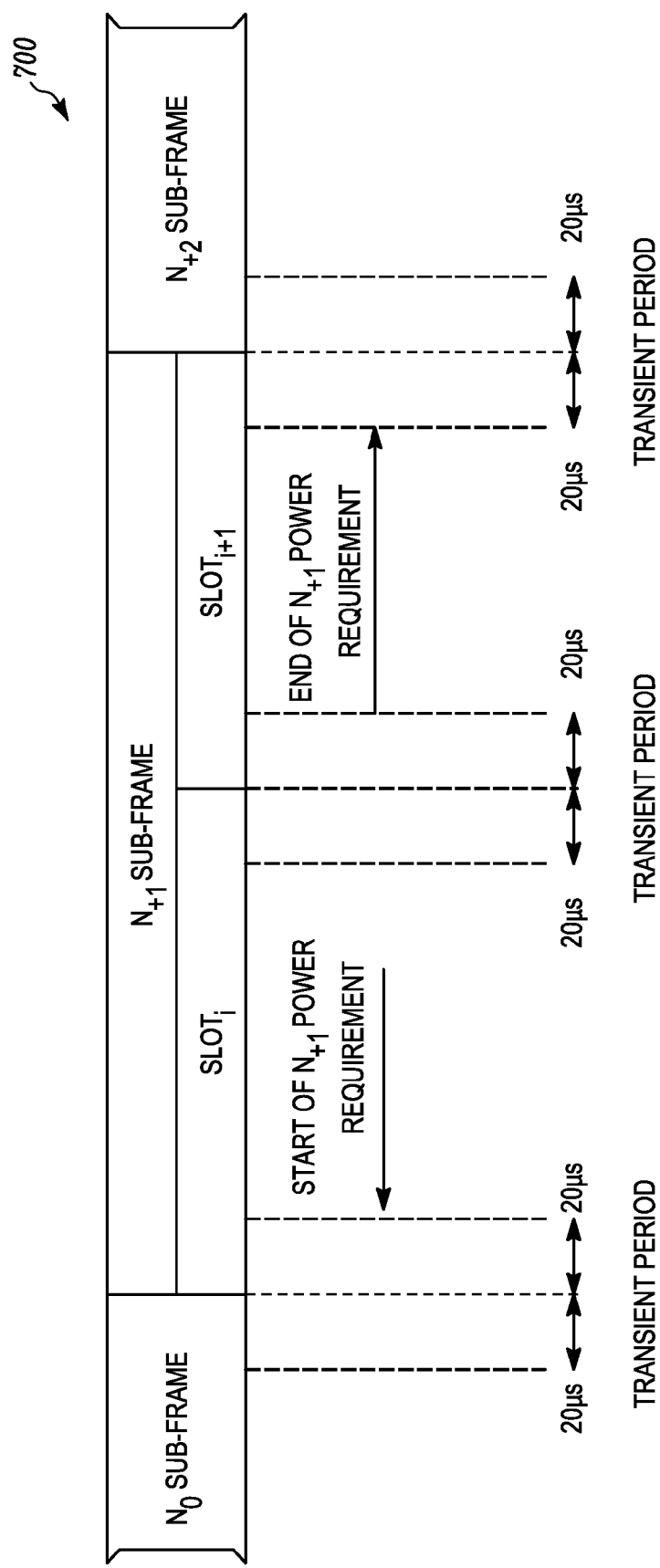
FIG. 7 is an example illustration of a transmission power template 700 according to a possible embodiment.

FIG. 7 is an example illustration of a transmission power template 700 according to a possible embodiment. According to Section 6.3.4.3 of LTE standard 36.101, the sub frame boundary time mask defines the observation period between the previous/subsequent sub-frame and the (reference) subframe. A transient period at a slot boundary within a subframe is only allowed in the case of Intra-sub-frame frequency hopping. For the cases when the subframe contains SRS the time masks in sub clause 6.3.4.4 can apply.

Changing the transmission RB's from the first slot to the second slot can be considered frequency hopping so that it is covered by the transmission power template 700 below and there can be an allowed transition period. Alternately, the specification the transmission power template 700 and description can change so that it does allow a transition period during which the power can be changed. Also, the definition of $P_{CMAX\_L}$ for carrier aggregation in Section 6.2.5A of 36.101 indicates that for each subframe, the $P_{CMAX\_L}$ is evaluated per slot and given by the minimum value taken over the transmission(s) within the slot; the minimum $P_{CMAX\_L}$ over the two slots is then applied for the entire subframe. $P_{PowerClass}$ shall not be exceeded by the UE during any period of time. A new definition can indicate that for subframes containing only PUCCH transmissions, $P_{CMAX\_L}$ is defined independently for the two slots, and the minimum is not used for the entire subframe.

Since the emissions requirements for CA are defined relative to the aggregated spectrum, the A-MPR at the center of the aggregated spectrum can be very small or zero for the UE configured for CA. Rather than massively over-provision the PUCCH to help the CA UE's so that the A-MPR is small for the PUCCH RB nearest to the edge of the aggregated spectrum, the PUCCH can be provisioned for the single CC UE (same PUCCH provisioning can be used for both types of users) and allow the CA UE to transmit only on the PUCCH RB with small or 0 dB of A-MPR. Currently, the CA UE is expected to transmit on both PUCCH RB's and is allowed to use the max A-MPR for these two RB's for both PUCCH transmissions. This approach may be used only if the difference in A-MPR between the two PUCCH RB's is very large. The difference value can be signalled by the operator either using the SIB or via RLC signalling. If a high power UE is allowed (26 dB), the A-MPR difference between the two PUCCH RB's may be increased by 3 dB relative to the already large A-MPR difference for the 23 dBm power class.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" or "at least one selected from the group of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. A method comprising:
ascertaining, at a device, a first additional maximum power reduction to apply to a transmission power for a first resource block of a physical uplink control channel transmission;
ascertaining a second additional maximum power reduction to apply to a transmission power for a second resource block of a physical uplink control channel transmission;
determining a difference between the first additional maximum power reduction and the second additional maximum power reduction; and
transmitting a physical uplink control channel resource block in a slot of a subframe only for the physical uplink control channel resource block of the first and second resource blocks with a lower additional maximum power reduction of the first additional maximum power reduction and the second additional maximum power reduction when a magnitude of the difference between the first additional maximum power reduction and the second additional maximum power reduction is greater than an additional maximum power reduction difference threshold.

2. The method according to claim 1, wherein the first and second additional maximum power reduction are dependent on whether the device is configured for carrier aggregation or configured for a single component carrier.

3. The method according to claim 1, wherein the additional maximum power reduction difference threshold is dependent on whether the device is configured for carrier aggregation or configured for a single component carrier.

4. The method according to claim 1, further comprising receiving the additional maximum power reduction difference threshold at the device.

5. The method according to claim 1, wherein the additional maximum power reduction difference threshold is pre-loaded in a memory of the device.

6. The method according to claim 1, wherein transmitting comprises transmitting the physical uplink control channel resource block in the slot of a subframe only for the physical uplink control channel resource block of the first and second resource blocks using the lower additional maximum power reduction applied to a transceiver uplink transmission power when the difference between the first additional maximum power reduction and the second additional maximum power reduction is greater than a threshold.

7. The method according to claim 1, further comprising receiving an indication of a resource allocation assignment of resource blocks for the physical uplink control channel transmission.

8. The method according to claim 1, further comprising defining a lower bound of a configured maximum device output power for a serving cell for the subframe using the slot with the lower additional maximum power reduction.

9. The method according to claim 1, further comprising modifying physical uplink control channel encoding when transmitting the physical uplink control channel resource block in the slot of the subframe only for the physical uplink control channel resource block of the first and second resource blocks with a lower additional maximum power reduction of the first additional maximum power reduction and the second additional maximum power reduction when a magnitude of the difference between the first additional maximum power reduction and the second additional maximum power reduction is greater than an additional maximum power reduction difference threshold.

10. A method comprising:
sending a physical uplink control channel configuration;
signaling an additional maximum power reduction difference threshold for a device to transmit in a physical uplink control channel resource block in a slot of a subframe for the physical uplink control channel configuration based on the additional maximum power reduction difference threshold; and
receiving the physical uplink control channel resource block in the slot of the subframe.

11. The method according to claim 10, wherein the additional maximum power reduction difference threshold indicates a threshold for a device to transmit in a slot of a subframe only for a physical uplink control channel resource block with a lower additional maximum power reduction when a magnitude of a difference between a first additional maximum power reduction for a first physical uplink control channel resource block and a second additional maximum power reduction for a second physical uplink control channel resource block is greater than an additional maximum power reduction difference threshold.

12. The method according to claim 10, wherein the additional maximum power reduction difference threshold is dependent on whether the device is configured for carrier aggregation or configured for a single component carrier.

13. The method according to claim 10, wherein sending the physical uplink control channel configuration comprises sending an indication of a resource allocation of resource blocks for transmission of the physical uplink control channel.

14. An apparatus comprising:
a controller to
ascertain a first additional maximum power reduction to apply to a transmission power for a first resource block of a physical uplink control channel transmission,
ascertain a second additional maximum power reduction to apply to a transmission power for a second resource block of a physical uplink control channel transmission, and
determine a difference between the first additional maximum power reduction and the second additional maximum power reduction; and
a transceiver coupled to the controller, the transceiver to transmit a physical uplink control channel resource block in a slot of a subframe only for the physical uplink control channel resource block of the first and second resource blocks with a lower additional maximum power reduction of the first additional maximum power reduction and the second additional maximum power reduction when a magnitude of the difference between the first additional maximum power reduction and the second additional maximum power reduction is greater than an additional maximum power reduction difference threshold.

15. The apparatus according to claim 14, wherein the first and second additional maximum power reduction are dependent on whether the apparatus is configured for carrier aggregation or configured for a single component carrier.

16. The apparatus according to claim 14, wherein the additional maximum power reduction difference threshold is dependent on whether the apparatus is configured for carrier aggregation or configured for a single component carrier.

17. The apparatus according to claim 14, wherein the transceiver receives the additional maximum power reduction difference threshold.

18. The apparatus according to claim 14, further comprising a memory, where the additional maximum power reduction difference threshold is pre-loaded in the memory.

19. The apparatus according to claim 14, wherein the transceiver receives an indication of a resource allocation assignment of resource blocks for the physical uplink control channel transmission.

20. The apparatus according to claim 14, wherein the controller defines a lower bound of a configured maximum transceiver output power for a serving cell for the subframe using the slot with the lower additional maximum power reduction.

21. An apparatus comprising
a transceiver; and
a controller coupled to the transceiver, the controller to cause the transceiver to
send a physical uplink control channel configuration, and
signal an additional maximum power reduction difference threshold for a device to transmit in a physical uplink control channel resource block in a slot of a subframe for the physical uplink control channel configuration based on the additional maximum power reduction difference threshold,
wherein the transceiver receives the physical uplink control channel resource block in the slot of the subframe.

22. The method according to claim 1, further comprising:
reconfiguring a transmitter for single component carrier transmission prior to transmitting the physical uplink control channel only transmission by moving a transmitter local oscillator to the center of the component carrier on which the physical uplink control channel is being transmitted when the device is configured for contiguous intra-band carrier aggregation and is transmitting only on the physical uplink control channel in a subframe.

* * * * *